Patented June 4, 1940

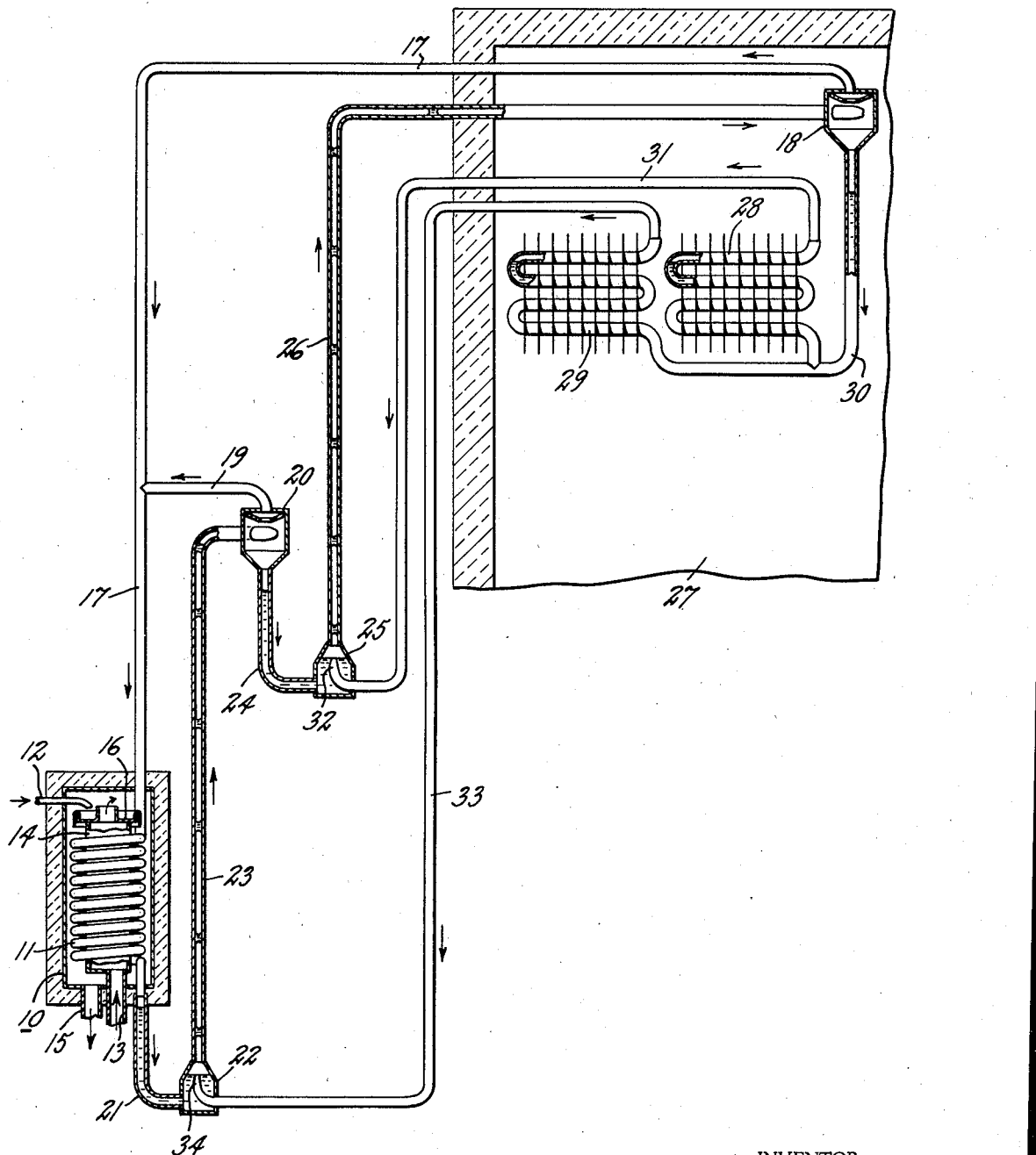

2,203,023

UNITED STATES PATENT OFFICE 2,203,023

REFRIGERATION

Walter A. Kuenzli, Evansville, Ind., assignor to Servel, Inc., New York, N. Y., a corporation of Delaware Application November 17, 1938, Serial No. 240,893

3 Claims. (Cl. 62—125)

My invention relates to refrigeration and more particularly to a heat transfer system by which cooling may be effected at a place above a source of refrigeration.

It is an object of the invention to provide greater stability in a system of this character operated by staged vapor lift action. The invention constitutes an improvement in a system like that described in an application Serial No. 218,485 of Bennet Carroll Shipman, filed July 9, 1938.

The drawing shows more or less schematically a heat transfer system embodying the invention. A cooling element 10 represents a source of refrigeration. It is shown as an evaporator of a uniform pressure absorption type refrigeration system like that described in an application Serial No. 107,852 of Albert R. Thomas, filed Oct. 27, 1936. In the evaporator 10 is a pipe coil 11. Liquid refrigerant enters the upper part of evaporator 10 through a conduit 12. Inert gas enters the upper part of evaporator 10 through a conduit 13 and a cylinder 14 which is within the pipe coil 11. Gas leaves the evaporator 10 through conduit 15. Liquid refrigerant from conduit 12 flows into a distributor 16. Liquid is deposited from distributor 16 onto the top of coil 11. The liquid refrigerant flows downward over coil 11 and evaporates and diffuses into the gas, producing a refrigeration effect for cooling the coil 11.

The upper end of coil 11 is connected by a conduit 17 to the upper part of a gas and liquid separation vessel 18. The upper end of coil 11 is also connected by conduit 17 and a conduit 19 to the upper part of a second gas and liquid separation vessel 20. The lower end of coil 11 is connected by a conduit 21 to the lower part of a gas lift vessel 22. The upper part of vessel 22 is connected by a conduit 23 to separation vessel 20. The bottom of separation vessel 20 is connected by a conduit 24 to the lower part of a second gas lift vessel 25. The top of vessel 25 is connected by a conduit 26 to separation vessel 18. In a refrigerator storage compartment 27 are two finned evaporator coils 28 and 29 arranged for cooling air in this compartment. The lower ends of evaporator coils 28 and 29 are connected by a conduit 30 to the lower part of separation vessel 18. The upper end of evaporator coil 28 is connected by a conduit 31 to a nozzle 32 in the gas or vapor lift vessel 25. The upper end of evaporator coil 29 is connected by a conduit 33 to a nozzle 34 in the gas or vapor lift vessel 22.

Coil 11 and evaporator coils 28 and 29 together with the above described connections therebetween form a heat transfer system which is evacuated and charged with a suitable heat transfer fluid, such as methyl chloride. When the refrigeration apparatus is started, the evaporator 10 lowers the temperature of condenser coil 11, causing a reduction in pressure in this coil and also in conduit 17, conduit 19, and separation vessels 18 and 20. Vapor in the upper evaporator coils 28 and 29 and in conduits 31 and 33 tries to escape to the part of the system in which the pressure has been lowered. In doing so, the vapor flows into liquid in the lift vessels 22 and 25 through the nozzles 32 and 34. From the nozzle 34 the gas bubbles upward into conduit 23 causing liquid to rise through this conduit from vessel 22 into separation vessel 20. Vapor bubbles from nozzle 32 upward into conduit 26 and causes liquid to rise through this conduit into separation vessel 18.

Refrigeration liquid flows from separation vessel 18 through conduit 30 into the evaporators 28 and 29. Liquid evaporates in evaporators 28 and 29 for cooling the refrigerator compartment 27. From the separation vessels 18 and 20, vapor flows through conduits 17 and 19 into the condenser coil 11. Vapor is condensed to liquid in coil 11 and flows therefrom through conduit 21 into lift chamber 22. Liquid is raised from lift chamber 22 through conduit 23 into vessel 20 as previously described. Liquid flows from vessel 20 through conduit 24 into lift chamber 25. Liquid is raised from chamber 25 through conduit 26 into separation vessel 18 as previously described.

Liquid is thus raised in two stages. Vapor for the first stage lift is supplied from evaporator 29 through conduit 33. Vapor for the second stage is supplied from evaporator 28 through conduit 31. There is thus provided a separate supply of vapor for each lifting stage.

What is claimed is:

1. A heat transfer system including a closed circuit for volatile fluid having a plurality of places of evaporation, a place of condensation at a level below said places of evaporation, and means for raising liquid from said place of condensation upward to said places of evaporation, said means utilizing vapor from one of said places of evaporation for raising liquid part of the way and vapor from another of said places of evaporation for raising liquid another part of the way.

2. A heat transfer system comprising a circuit for volatile heat transfer fluid including a plurality of evaporators at an upper level and a condenser at a lower level, a plurality of vapor liquid lifts arranged in series to raise liquid from said lower level to said upper level, one of said lifts being connected to receive vapor from one of said evaporators, and another of said lifts being connected to receive vapor from another of said evaporators.

3. A method of heat transfer which includes evaporating liquid refrigerant in a plurality of places, condensing vaporous refrigerant below said places of evaporation, raising condensed refrigerant by vapor lift action in a plurality of stages, utilizing vapor from one of said places of evaporation in one of said stages and vapor from another of said places of evaporation in another of said stages.

WALTER A. KUENZLI.